April 23, 1940. H. B. JOHNSON 2,197,865
PROCESS OF CONCENTRATING PHOSPHATE BEARING MINERALS
Filed May 2, 1938  6 Sheets-Sheet 1

UNITED STATES PATENT OFFICE 2,197,865

PROCESS OF CONCENTRATING PHOSPHATE BEARING MINERALS

Herbert B. Johnson, Rochester, N. Y., assignor to Ritter Products Corporation, Ritter Park, Rochester, N. Y., a corporation of New York Application May 2, 1938, Serial No. 205,463

21 Claims. (Cl. 209—12)

My invention relates, generally, to the concentration of phosphate-bearing minerals, and it has particular relation to the electrostatic separation of phosphate-bearing minerals, occurring naturally or produced artificially.

Phosphate rock, phosphate sands (matrix), monazite sand, apatite and other phosphate-bearing minerals or products are located in many parts of the world, the principal deposits in the United States being located in Florida, Tennessee, Idaho and Wyoming. The minerals or materials commonly associated with phosphate, such as silica, dolomite, limestone, granite, schist, etc., vary considerably, not only in localities but in each deposit. Some method of concentration generally is used to control the B. P. L. (bone, phosphate and lime) content of shipments to fertilizer and chemical manufacturers. Premiums usually are paid for each percentage of B. P. L. content over 68% and penalties are deducted by some buyers for excess alumina and iron content.

For many years producers of phosphate have operated washing plants, which involve principally a screening or sizing separation of the crude rock, or matrix, and, in some cases, wet gravity separation methods are employed to control the B. P. L. grade of concentrates. Usually some size is decided upon, 10 mesh or 20 mesh, depending upon the physical characteristics of the crude material. The oversize is shipped as concentrates, containing approximately 55% of the total B. P. L. The undersize, containing approximately 45% of the total B. P. L. has, in many instances, been conveyed to tailing dumps as waste. The crude material varies from 40% to 55% B. P. L. content; the washery concentrates from 70% to 75% B. P. L., and the washery tailings from 20% to 35% B. P. L. The loss of B. P. L. in the washery tailings averages approximately 45% of the total in the rock or matrix.

During the past several years considerable thought has been given to the additional recovery of phosphate from the washery tailings, thereby increasing the total recovery of B. P. L. per ton handled. Several concentrating plants have been built and are operating successfully, using two methods of wet concentration, namely, flotation and tabling, and both employing the use of reagents such as caustic soda, fuel oil, sulphite liquor, fatty acid, rosin soaps, etc., to coat the phosphate minerals and permit their separation from silica and other non-phosphatic minerals not so easily coated with these reagents. The flotation of so-called non-metallic minerals is not generally accepted as being as well developed and reliable as well known methods of separating metallic minerals from non-metallic minerals, or gangue, by the flotation process with the use of well known reagents. Some difficulty is experienced in obtaining highest recovery because of the failure to uniformly coat the phosphate particles of the phosphate-bearing minerals when using reagents which will not coat the associated silica and other non-phosphate minerals. It is well known that the white, chalky particles of phosphate, which are usually highest in B. P. L. content, will not take an oil or reagent coating as easily as the darker colored particles, and that the bulk of B. P. L. loss in the tailings is largely confined to the loss of these soft white particles, chiefly in the finer sizes, which are most difficult to concentrate by any method. A very close control, therefore, is required for the capacity, speed, reagents, dilution and sizing in order to secure high grade concentrates and highest recovery of phosphate consistent with variations in the head feed or washery tailings, both as to amount and character of impurities to be eliminated as flotation tailings.

The gravity table concentrating method depends largely upon the reagents used to overcome the slight difference in specific gravity between the minerals to be separated and to agglomerate the phosphate minerals so they are separated from the non-phosphate minerals which do not take the reagent coating, by floating off the side of the table while the uncoated minerals are discharged at the end of the table. The mixture of reagents, amount of reagents per ton, dilution of solids and water, capacity feeding, table speed and adjustments must be very closely controlled to assure uniform concentration with minimum loss of B. P. L.

Both of these wet methods of concentration depend upon the same general principle of operation which, briefly, is the difference in surface tension or oiling qualities of the minerals to be separated.

My invention relates to an entirely different basic principle, which is the difference in electrostatic reversibility of the materials to be separated. This is largely a surface action which may be changed to a marked degree prior to separation electrostatically by conditioning or coating the surface of the minerals to better control the behavior in an electrostatic field, thereby permitting separation which could not heretofore be made of minerals in their natural state.

My invention relates more particularly to the concentration of the finer sizes of phosphate bearing minerals which are mechanically freed by customary crushing, grinding and screening procedure, or which are mechanically free in their natural state, such as the washery tailings. Also, it may be used for concentrating the crude phosphate ore, washery tailings, middlings, or old tailing dumps.

The electrostatic separation of phosphate-bearing minerals is effected in an electrostatic separator which may comprise one or more pairs of electrodes that are mounted in spaced apart relation for receiving the minerals therebetween. The electrodes are generally cylindrical in shape, are from 1" to 2" in diameter and from 6' to 8' long. The electrodes are arranged to be continuously rotated while they are connected to a source of relatively high direct voltage, such as from 5,000 to 15,000 volts. An electrostatic separating machine of this general type is disclosed in my copending application, Serial No. 128,097, filed February 27, 1937, and assigned to the assignee of this application, now Patent No. 2,135,716. Provision is made for reversing the polarities of the electrodes so that the minerals to be separated may be subjected to oppositely directed electrostatic fields as the separating conditions may warrant. Preferably, the minerals to be separated are fed onto one of the electrodes, which may be termed the material conveying electrode. The other electrode is spaced from 1" to 2" away from the material conveying electrode in a position to one side and above the same. The electrodes are, of course, suitably insulated to withstand the direct voltage to which they are subjected.

In making a test on a representative sample of washery tailings from Florida, the following characteristics of this material in an electrostatic field were noted:

1. The mineral surface should be dry when passing through the electrostatic field in order to maintain greatest difference in reversibility and assure best separation control.

2. The silica, to some degree, is pyroelectric and the conductivity increases, to a certain extent, with increased temperature.

3. When the polarity of the material conveying electrode is negative the silica is most easily repelled, while the phosphate is most easily repelled when the material conveying electrode has a positive polarity.

I have discovered that the relative polarities of the electrodes of the electrostatic separator control, to a large extent, the separation that can be obtained when certain minerals are present. For example, when $SiO_2$ minerals are present along with other minerals, it is possible to control the position assumed by the $SiO_2$ minerals in the electrostatic field merely by reversing the direction thereof. When the material conveying electrode has a negative polarity, the $SiO_2$ minerals are repelled therefrom. The opposite effect takes place when the material conveying electrode is positive since, in this case, the $SiO_2$ minerals are not repelled, but, rather, they remain in close proximity to the material conveying electrode. Advantage is taken of this discovery in the concentration of phosphate-bearing minerals in order to obtain a phosphate product having a high B. P. L. content.

In practicing my improved process a sample of washery tailings was screened through a 40 mesh screen and fed into the electrostatic field by a material conveying electrode energized at positive polarity, there being about 12,000 volts applied between the electrodes. The following table sets forth the analyses of the various products obtained as the result of this separation:

(1)

| Product | Percent weight | Percent B. P. L. | Percent insoluble | Percent total B. P. L. |
|---|---|---|---|---|
| Heads | 100.00 | 16.76 | 79.94 | 100.00 |
| Concentrates | 19.70 | 27.45 | 66.85 | 32.10 |
| Middlings | 2.60 | 31.51 | 62.35 | 4.90 |
| Tailings | 77.70 | 13.56 | 83.85 | 63.00 (loss) |
| Total | 100.00 | | | 100.00 |

While the foregoing analyses show that the percent of B. P. L. in the concentrates was increased to a considerable extent over the percent B. P. L. of the heads, this separation is not considered to be commercially satisfactory, since 63% of the total B. P. L. remained in the tailings.

The principal object of my invention is to increase the B. P. L. content of the product resulting from the concentration of phosphate-bearing minerals.

Another object of my invention is to electrostatically separate phosphate-bearing minerals in order to obtain a phosphate product having a high B. P. L. content.

A further object of my invention is to increase the B. P. L. content of the concentrates (phosphate products) now obtained from concentrating washery tailings by flotation.

Still another object of my invention is to reduce the B. P. L. content of the discarded tailings resulting from the flotation concentration of washery tailings by electrostatically concentrating the flotation concentrates.

Other objects of my invention will, in part, be obvious and in part appear hereinafter. The scope of its application will be indicated in the appended claims.

For a more complete understanding of the nature and scope of my invention, reference may be had to the following detailed description, taken in connection with the accompanying drawings, in which.

Figure 1:
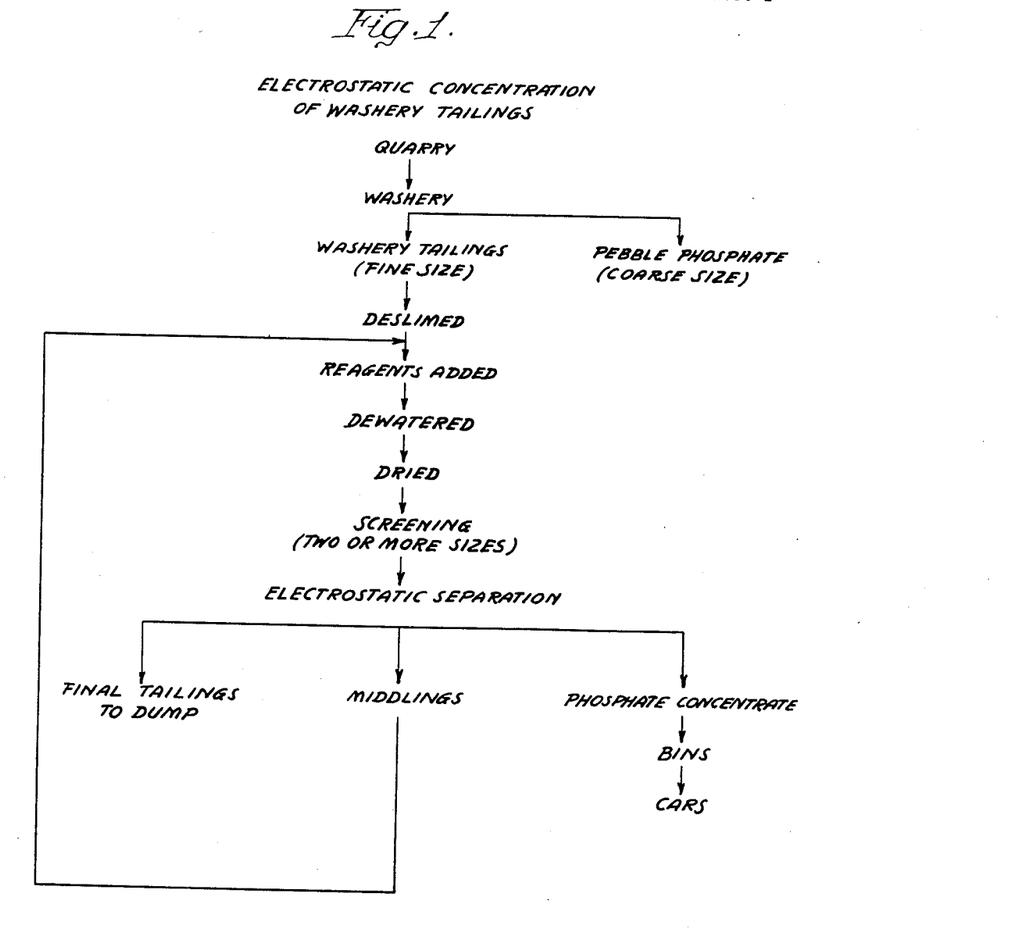
Figure 1 is a flow sheet showing how the steps of electrostatic separation may be employed for concentrating the washery tailings.

As illustrated in Figure 1, the phosphate ore from the quarry passes through a washery where the pebble phosphate is separated out from the washery tailings. The pebble phosphate is suitable for commercial use, while the washery tailings are not, since their B. P. L. content is too low. As indicated hereinbefore, steps are being taken to recover the phosphate from the washery tailings insofar as appears to be feasible from a commercial and economic standpoint. It is to the recovery of the phosphate from the washery tailings that my present invention is particularly addressed.

As indicated in the analyses in Table 1 above, the recovery of phosphate through the use of the electrostatic separating process applied directly to the washery tailings does not appear to be commercially practicable. The reason for these comparatively poor results lies in the fact that there appears to be little difference, from an electrostatic standpoint, in the action of the phosphate as compared to the balance of the minerals in the washery tailings. That is, there was no difference in the positioning of the phosphate with respect to the positioning of the other minerals, such as $SiO_2$, as would permit a commercial separation to be obtained.

I then discovered that, if the washery tailings were first coated with the reagents that are employed for practicing the flotation separating process, there is a marked difference between the response of the different minerals when they are subjected to the action of an electrostatic field. Accordingly, as shown in Figure 1 of the drawings, the washery tailings are first treated with suitable reagents and then, after being dewatered and dried, are screened into two or more sizes, as required. They are next passed through the electrostatic separator, where a phosphate concentrate is produced that is commercially usable. The middlings are returned to be retreated with the washery tailings, while the tailings of the electrostatic separating process are discarded.

Various reagents may be employed to bring about this difference in response of the phosphate minerals as compared to the other minerals in the washery tailings which it is desired to separate out. The reagents commonly used in flotation practice, such as fuel oils, distilled wood oils, sulphite liquor, and the more fatty reagents, coat the phosphate minerals principally and make them much more susceptible to reversibility action in an electrostatic field. These reagents do not appear to change the reversibility action of the silica or non-phosphate-bearing minerals. However, I do not wish to be limited to the use of these particular reagents, either alone or in combination, since other oils and reagents commonly used in flotation work will undoubtedly have some control in the degree of electrostatic susceptibility of the minerals in an electrostatic field.

I have found that the $SiO_2$ minerals are repelled from the material conveying electrode when it is negative, while the phosphate particles, when they have been coated with a reagent, are repelled from a material conveying electrode when it is maintained at the positive polarity. Advantage is taken of these characteristics to electrostatically separate the treated washery tailings by the electrostatic process.

Figure 2:
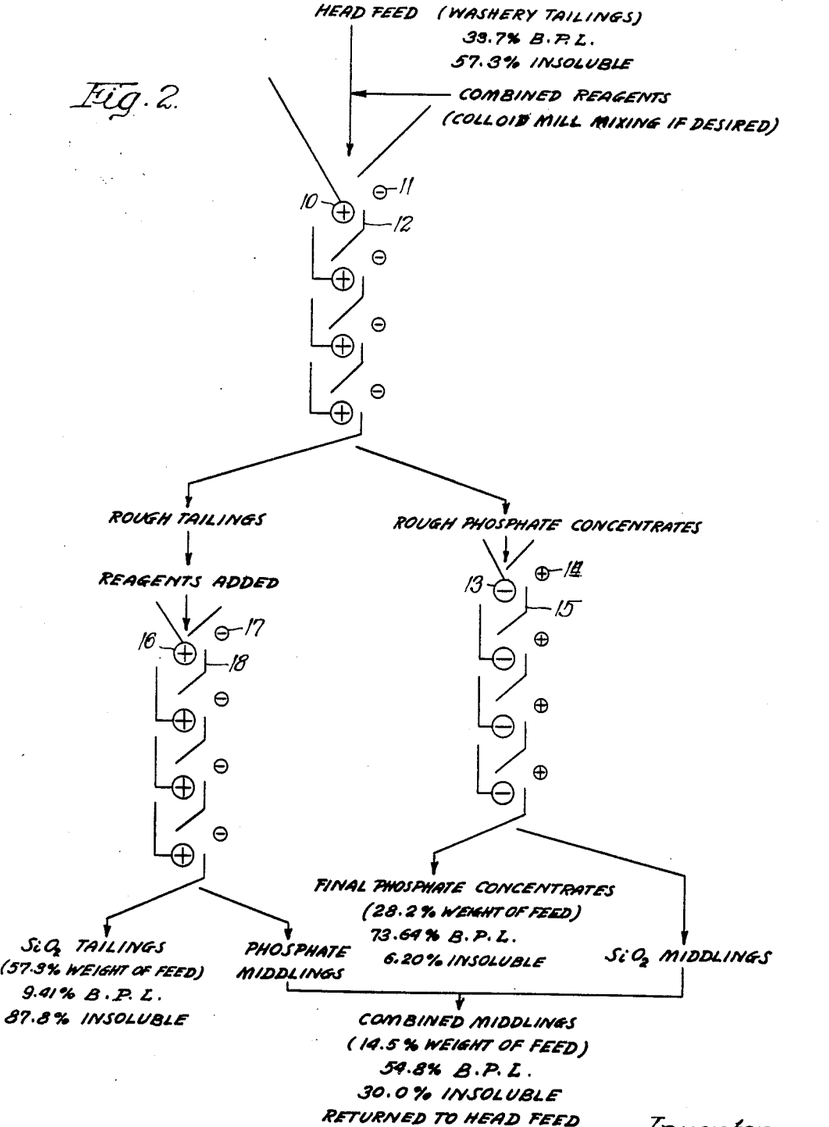
Figure 2 is a flow sheet showing in more detail the steps of electrostatic separation that are indicated generally in Fig. 1.

As illustrated in more detail in Figure 2 of the drawings, the head feed comprising the washery tailings is treated with suitable reagents before being fed to the electrostatic separator. In order to increase the covering power of the reagents they may be passed through a colloid mill, such as a "Premier mill," in order to thoroughly mix them and to improve their covering power. The treated washery tailings are then fed onto the first of a series of material conveying electrodes 10 having corresponding spaced electrodes 11. Dividers 12 serve to direct the material being processed from one pair of electrodes to the next pair, so that the unseparated part is always in close proximity to the material conveying electrodes 10. The electrodes 10 and 11 are maintained at a high difference of direct voltage, for example, 8,000 to 12,000 volts, with the material conveying electrodes 10 being connected to the positive terminal of the source while the electrodes 11 are connected to the negative terminal thereof.

In passing between the electrodes 10 and 11 the treated washery tailings are separated into rough tailings and rough phosphate concentrates, the former remaining in close proximity to the material conveying electrodes 10 while the latter is repelled a substantial distance therefrom. Since the rough phosphate concentrates comprise the smaller percentage of the total amount of material being separated, the polarities indicated for the electrodes 10 and 11 are employed in order to repel as concentrates this smaller portion.

As illustrated in Figure 2 of the drawings, the rough phosphate concentrates are then fed onto material conveying electrodes 13 which are at a negative polarity while the corresponding electrodes 14 are at a positive polarity. Dividers 15 serve to direct the material from one pair of electrodes to the next pair. Since the rough phosphate concentrates comprise principally phosphate particles, the polarities of the electrodes 13 and 14 are the reverse of those used for the electrodes 10 and 11. A final phosphate concentrate then remains in close proximity to the negative electrodes 13 while a middling product comprising largely $SiO_2$ is repelled from the electrodes 13.

Since the rough tailings resulting from processing the treated washery tailings through the electrodes 10 and 11 still contain an appreciable percentage of phosphate, it is desirable to further treat them. One of the reasons for the comparatively large percentage of phosphate in the rough tailings lies in the fact that complete coverage of them by the reagents was not obtained in the first instance. Accordingly, before they are further electrostatically treated, the rough tailings are mixed with suitable reagents in order to coat the phosphate particles thereof. The treated rough tailings are then fed onto material conveying electrodes 16 which are maintained at a positive polarity while the electrodes 17 are at a negative polarity. Dividers 18 serve to direct the flow of material between the pairs of electrodes. Since the phosphate portion of the rough tailings is smaller than the balance thereof, the electrodes 16 are maintained at a positive polarity in order to repel the phosphate product. The larger portion, comprising principally $SiO_2$, remains in close proximity to the electrodes 16 and forms tailings which may be discarded.

The phosphate middlings products resulting from the last two electrostatic separations may be combined and returned to the head feed where they can be combined with the washery tailings and treated with the reagents for again passing through the electrostatic separating process.

The following table indicates the degree of concentration that can be obtained when washery tailings are treated according to the flow sheets shown in Figures 1 and 2 of the drawings:

(2)

| Product | Percent weight | Percent B. P. L. | Percent insoluble | Percent total B. P. L. |
|---|---|---|---|---|
| Heads | 100.00 | 33.70 | 57.30 | 100.00 |
| Concentrates | 28.20 | 73.64 | 6.20 | 61.00 |
| Middlings | 14.50 | 54.80 | 30.00 | 23.20 |
| Tailings | 57.30 | 9.41 | 87.80 | 15.80 (loss) |
| Total | 100.00 | | | 100.00 |

As indicated in Table 2, the B. P. L. content of the washery tailings was 33.70%. The B. P. L. content of the final phosphate concentrates was 73.64%, thereby indicating that the electrostatic method of concentrating the washery tailings is highly effective. At the same time, the B. P. L. content of the tailings was only 9.41%. As a result, only a comparatively small portion of the B. P. L. content of the original phosphate ore is discarded.

While my invention may be employed for directly concentrating the washery tailings to recover the phosphate therefrom, it may also be employed in connection with the flotation process for further increasing the B. P. L. content of the concentrate which is obtained thereby. In operating the flotation process a balance must be struck between the B. P. L. content of the resulting product and the cost of obtaining the same. Accordingly, it has been common practice to discard an appreciable portion of the B. P. L. content in the tailings in order to reduce the cost of the flotation process. By combining the electrostatic separating process with the flotation process, it is possible to recover more of the B. P. L. content from the tailings by obtaining a concentrate as a result of the flotation process which has a lower B. P. L. content than had previously been considered as commercially practicable. The B. P. L. content in the final product can then be readily increased substantially to the theoretical maximum by employing the electrostatic separation process as disclosed herein. As a result, the over-all efficiency of the recovery process is materially improved, since the amount of phosphate recovered per ton of crude ore handled is greatly increased.

Figure 3:
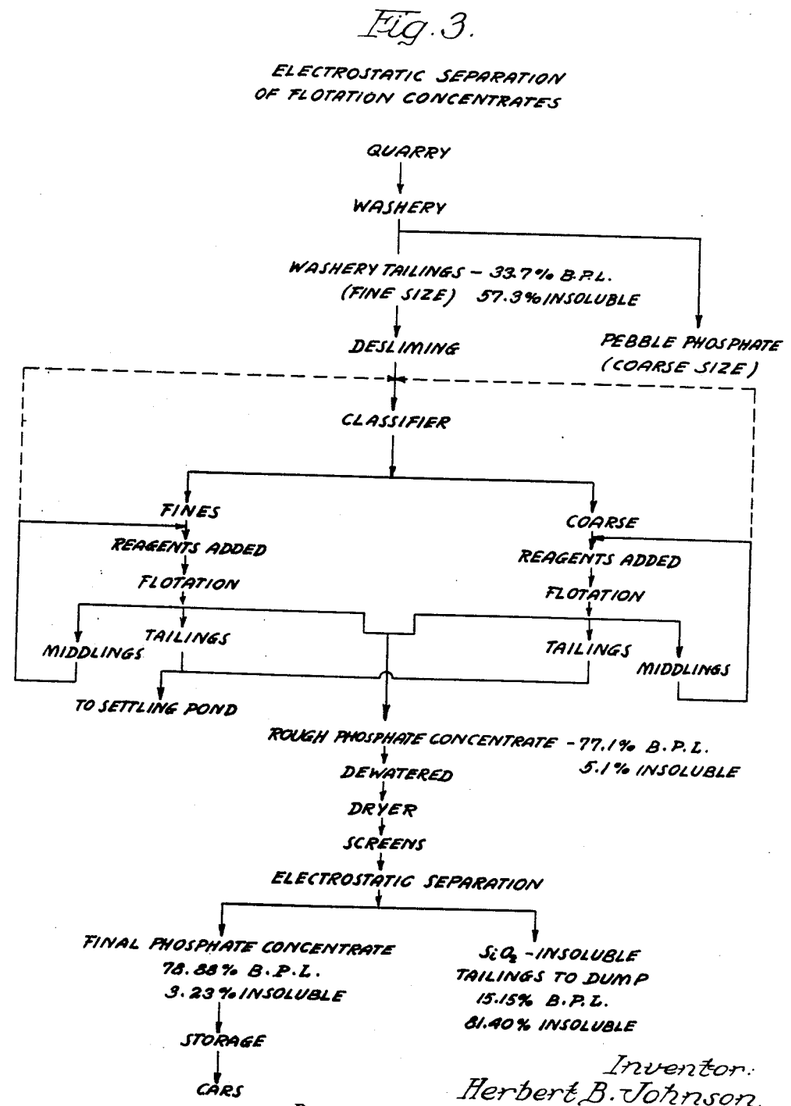
Figure 3 is a flow sheet showing how the steps of electrostatic separation may be employed for further concentrating the concentrates resulting from the flotation process.

In Figure 3 of the drawings the flow sheet for processing crude phosphate ore through the combined flotation and electrostatic processes is illustrated. As there shown, the crude phosphate ore from the quarry is passed through the washery where the pebble phosphate is removed from the ore, with the fine sizes of washery tailings remaining. These tailings are deslimed and then passed through a classifier which separates them into fine and coarse sizes. Reagents are then added in accordance with well known flotation practice and the products are separated into middlings, tailings and concentrates. The tailings may be discarded, while the middlings may be returned for re-processing, either directly to the point where the reagents are added or, as indicated by the broken lines, at a point ahead of the classifier. The concentrates of the flotation processes are combined, dewatered, dried and screened for further processing by electrostatic separation.

Figure 4:
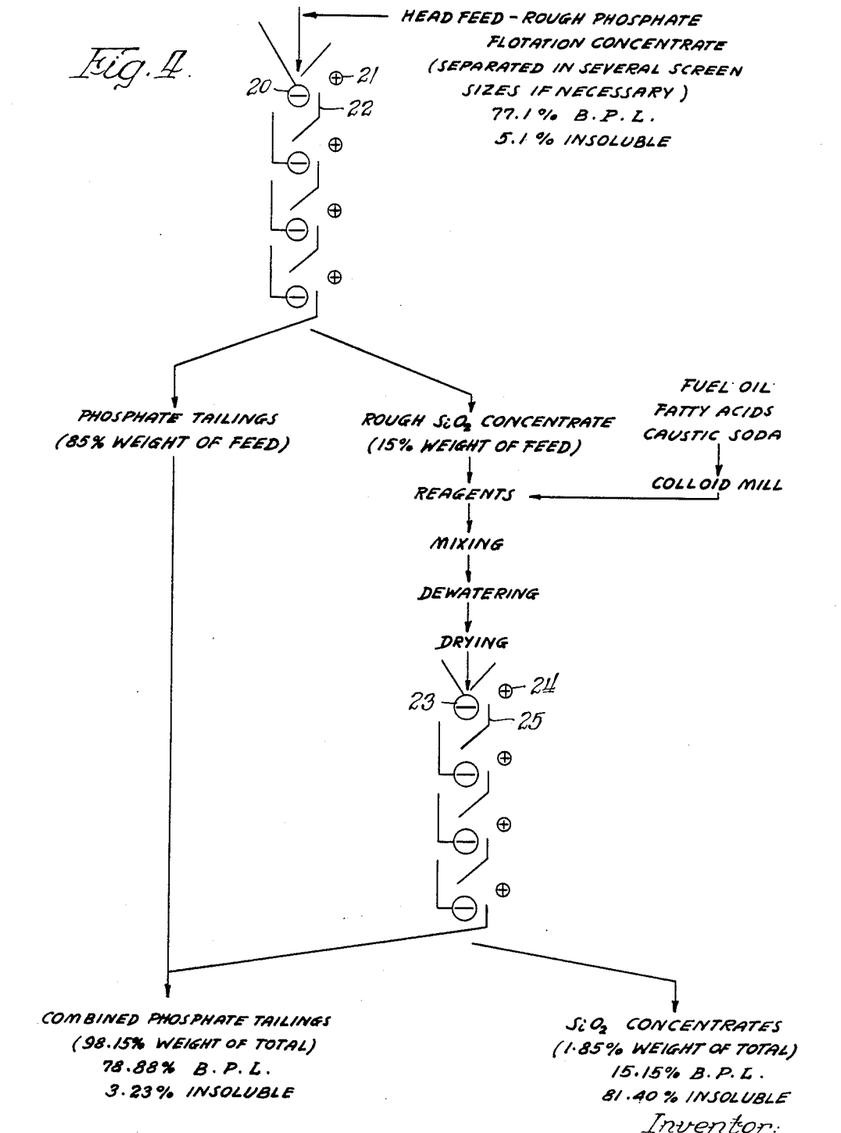
Figure 4 is a flow sheet showing in more detail the steps of electrostatic separation that may be employed in the process of Fig. 3.

In Figure 4 of the drawings the flow sheet for the electrostatic separation of the flotation concentrates is illustrated. As there indicated, the head feed comprising the rough phosphate concentrate from the flotation process is separated into several screen sizes, if desired, before further processing. The screened flotation concentrate is then fed onto the first of a series of material conveying electrodes 20 having corresponding electrodes 21 which are maintained at a high difference of direct voltage, for example, 8000 to 12,000 volts. Dividers 22 serve to direct the flow of material from one pair of electrodes to the next pair. Since the material being processed consists largely of the phosphate product while the material to be separated out comprises only a small portion, the electrodes 21 are preferably made positive while the material conveying electrodes 20 are negative. A phosphate tailing product then remains in close proximity to the negative electrodes 20, while a product, comprising principally $SiO_2$, is repelled therefrom to form a rough concentrate.

Since the rough concentrate may still contain an appreciable B. P. L. content, it is desirable to further process it for recovering as much of it as possible. Accordingly, the rough concentrate is treated with suitable reagents for further processing. As indicated in Figure 4, the reagents may be passed through a colloid mill in order to increase their covering power. After the reagents have been mixed with the rough concentrates they are dewatered and dried and are passed through an electrostatic separator comprising pairs of electrodes 23 and 24 having dividers 25 for directing the flow of material from one pair of electrodes to the next pair. Preferably the electrodes 23 are connected to the negative terminal of the high direct voltage source, while the electrodes 24 are connected to the positive terminal. A phosphate tailing product is obtained which can be directly combined with the phosphate tailing product of the first electrostatic separating step.

As indicated in the flow sheet shown in Figure 3 of the drawings, the B. P. L. content of the washery tailings was 33.70% in the material under consideration. The B. P. L. content of the flotation concentrates was 77.10% in this instance. The B. P. L. content of the combined phosphate tailings obtained from the two electrostatic separating steps was 78.88% and this product comprised 98.15% by weight of the total flotation concentrates. In this instance the B. P. L. content of the resulting product was increased by nearly 2%. When it is recalled that a premium is paid for increased B. P. L. content in this range, the advantages resulting from the further processing of the flotation concentrates by electrostatic separation are obvious.

As indicated, it may be desirable to separate the flotation concentrates into different screen sizes prior to electrostatic separation thereof. The following table shows the analyses of the products when the flotation concentrates are screened into four sizes:

(3)

| Product | Percent weights | Percent B. P. L. | Percent insoluble |
|---|---|---|---|
| Flotation concentrate | 100.00 | 77.10 | 5.10 |
| Plus 20 mesh | .12 | 76.24 | 5.40 |
| 20 plus 40 mesh | 21.73 | 79.44 | 3.12 |
| 40 plus 60 mesh | 31.32 | 77.88 | 4.64 |
| Minus 60 mesh | 46.83 | 75.70 | 6.90 |
| Total | 100.00 | | |

The three screen sizes, namely, 20 plus 40 mesh, 40 plus 60 mesh, and minus 60 mesh, were then electrostatically separated according to the flow sheet shown in Figure 4 of the drawings. The analyses of the various products obtained by this separation are shown in the following tables numbered 4, 5 and 6:

(4)

(20 plus 40 mesh size)

| Product | Percent weight of size | Percent B. P. L. | Percent recovery |
|---|---|---|---|
| Heads | 100.00 | 79.44 | 100.00 |
| Concentrates | .31 | 22.55 | .09 |
| Tailings | 99.69 | 79.67 | 99.91 |
| Total | 100.00 |  | 100.00 |

(5)

(40 plus 60 mesh size)

| Product | Percent weight of size | Percent B. P. L. | Percent recovery |
|---|---|---|---|
| Heads | 100.00 | 77.88 | 100.00 |
| Concentrates | 1.60 | 10.90 | .22 |
| Tailings | 98.40 | 79.20 | 99.78 |
| Total | 100.00 |  | 100.00 |

(6)

(Minus 60 mesh size)

| Product | Percent weight of size | Percent B. P. L. | Percent recovery |
|---|---|---|---|
| Heads | 100.00 | 75.70 | 100.00 |
| Concentrates | 3.50 | 16.60 | .77 |
| Tailings | 96.50 | 77.99 | 99.23 |
| Total | 100.00 |  | 100.00 |

The following table (7) illustrates the final results that are obtained when the products, electrostatically separated according to screen size, are recombined into a final product:

(7)

| Product | Percent weight | Percent B. P. L. | Percent insoluble | Percent total B. P. L. |
|---|---|---|---|---|
| Heads | 100.00 | 77.10 | 5.10 | 100.00 |
| Concentrates | 1.85 | 15.15 | 81.40 | .36 (loss) |
| Tailings | 98.15 | 78.88 | 3.23 | 99.64 |
| Total | 100.00 |  |  | 100.00 |

The screen test of the flotation concentrates, indicated in Tables 4, 5 and 6, shows that better flotation work is done on the middle sizes, from 20 to probably 50 mesh. However, it will be obvious that the electrostatic separating process indicates nearly equally as good separating efficiency for all sizes, which affords a higher recovery and a more uniform grade of concentrate.

Figure 5:
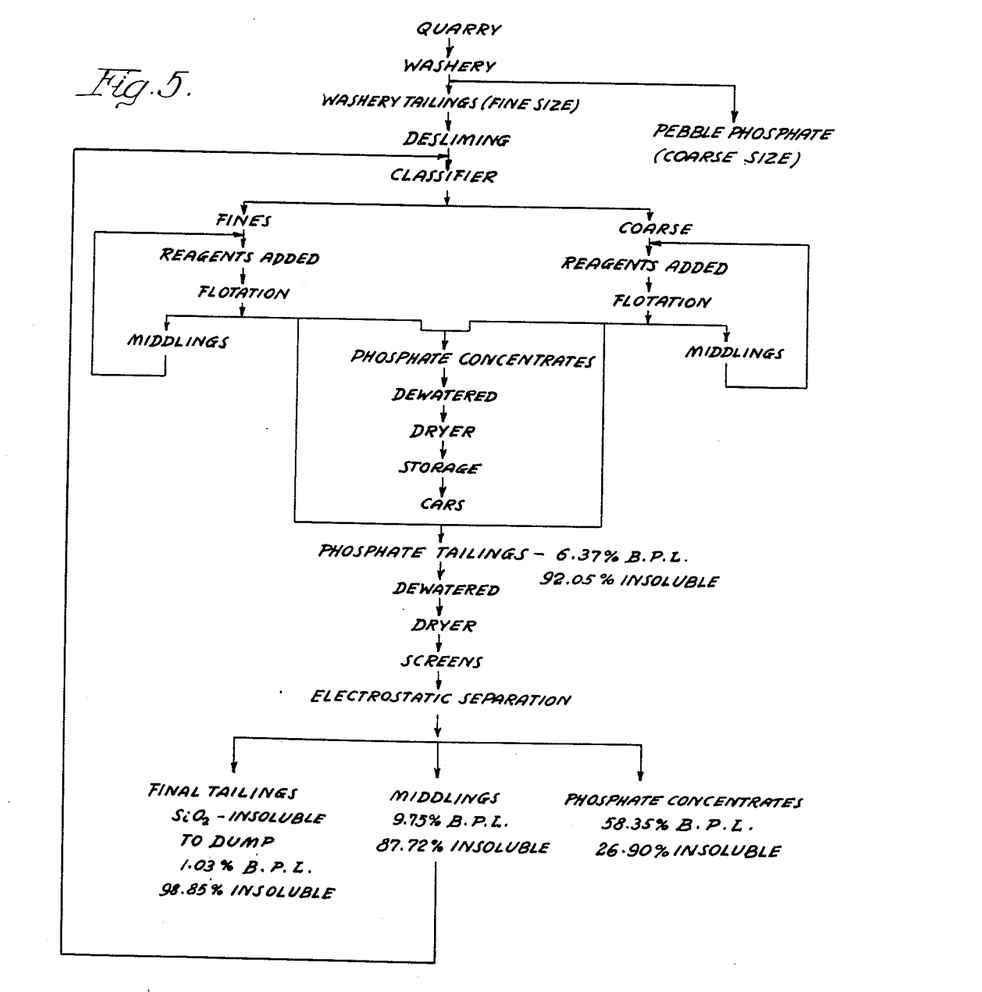
Figure 5 is a flow sheet showing how the steps of electrostatic separation may be employed for concentrating the tailings resulting from the flotation process.

In Figure 5 of the drawings I have shown a flow sheet which illustrates how the phosphate tailings from the flotation concentrating process may be further concentrated to recover the phosphate therefrom. It will be understood that the tailings from the flotation concentration process may be directly concentrated as shown in Figure 5, or tailing dumps, previously considered unusable and waste material, may be processed to recover the phosphate therefrom.

As shown in Figure 5 of the drawings, the crude phosphate ore from the quarry is passed through the washery, where the pebble phosphate is removed, leaving the fine sized tailings. These tailings are deslimed and classified according to size. Suitable flotation reagents are then added and, by flotation, the different sizes are separated into concentrates, middlings and tailings. The phosphate concentrates may be further processed, as shown in Figure 4 of the drawings, or they may be disposed of without further processing. The middlings may be returned for repassing through the flotation processes.

The phosphate tailings from the flotation processes are combined, dewatered, dried and screened, preparatory to electrostatic separation. By means of the electrostatic separation the tailings are separated into phosphate concentrates, middlings, and final tailings. The middling may be returned to the classifier for re-processing, while the final tailings are discarded. The phosphate concentrates may be used, or further processed electrostatically, as desired.

Figure 6:
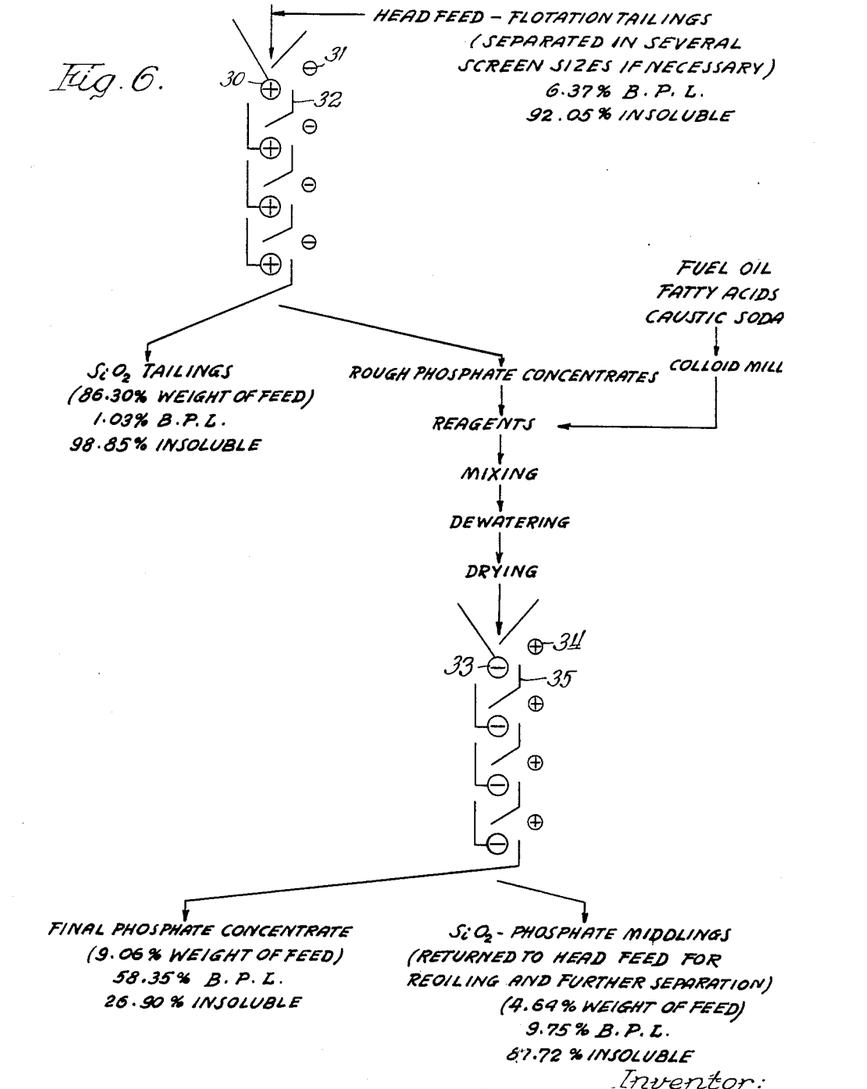
Figure 6 is a flow sheet showing in more detail the steps of electrostatic separation that may be employed in the process of Fig. 5.

In Figure 6 of the drawings the flow sheet for the electrostatic separation of the flotation tailings shown in Figure 5 is illustrated. As there shown, the flotation tailings comprising the head feed may be separated into several screen sizes if desired. The product is then successively passed between pairs of electrodes 30 and 31 having dividers 32 for directing the flow of material from one pair to the next pair. Since the phosphate portion of the flotation tailings is small compared to the remainder, the material conveying electrodes 30 are connected to the positive terminal of the direct voltage source while the electrodes 31 are connected to the negative terminal. A rough phosphate concentrate is then repelled from the positive material conveying electrodes 30. This rough phosphate concentrate is then treated with suitable reagents which may be passed through a colloid mill to increase their covering power. The treated rough phosphate concentrates are then mixed with the reagents, dewatered and dried, preparatory to further electrostatic separation. The resulting product is then successively fed onto material conveying electrodes 33 having corresponding electrodes 34 spaced therefrom. Suitable dividers 35 serve to direct the flow of material from one pair of electrodes to the next pair. Since the phosphate portion of the product being processed constitutes the larger portion, the material conveying electrodes 33 are connected to the negative terminal of the high direct voltage source, while the electrodes 34 are connected to the positive terminal.

The following Table 8 illustrates the degree of improvement in B. P. L. content that is obtained when the flotation tailings are treated:

(8)

| Product | Percent weight | Percent B. P. L. | Percent insoluble | Percent total B. P. L. |
|---|---|---|---|---|
| Heads | 100.00 | 6.37 | 92.05 | 100.00 |
| Concentrates | 9.06 | 58.35 | 26.90 | 80.00 |
| Middlings | 4.64 | 9.75 | 87.72 | 6.70 |
| Tailings | 86.50 | 1.03 | 98.85 | 13.30 (loss) |
| Total | 100.00 |  |  | 100.00 |

My electrostatic process of dry separation offers many advantages over the present tabling and flotation methods of phosphate concentration. The separating efficiency of my process largely depends upon the complete coating of the particles with suitable oil or other reagents in combination. When coated phosphate materials are subjected to my reversibility separation, the percentage of particles which have been not porperly coated are promptly repelled from a negatively charged conveying electrode as rough concentrates for further reagent coating. The reagent coating, therefore, is automatically controlled through reversibility electrostatic separation which directly controls the recovery of phosphate.

Each linear foot of separating electrode, once adjusted, continuously operates at the same degree of separating efficiency and produces the same grade of separated product. Therefore, any variation in capacity has no effect on the separating efficiency, which is the same whether 50 linear feet or 500 linear feet of separating surface are used.

The power consumption of a concentrating plant of 150 tons hourly capacity is approximately 150 H. P. when using my improved process alone, as against 425 H. P. for a flotation plant of the same capacity. The drying cost of the head feed to my process is largely offset by the water pumping and circulation cost connected with the operation of a flotation plant.

My improved process is also especially well adapted for use in conjunction with present tabling of flotation operations. It is well known that, on account of the premium of 15¢ per unit of B. P. L. per ton in excess of 68% B. P. L., now paid for phosphate concentrates, these plants are operated chiefly for the production of highest possible B. P. L. grade of concentrates, at the expense of phosphate recovery. Operators often consider that it is cheaper to get another ton of crude phosphate ore from the quarry, rather than to reduce the grade of concentrates by increasing the flotation recovery and producing cleaner tailings. This, of course, is not entirely true, because each ton of B. P. L. wasted in the flotation tailings bears the cost of quarrying, pumping, washing, reagents, power and flotation separation cost. Therefore, it is two or three times more valuable than a ton of B. P. L. in the matrix deposit. For example: On the basis of concentrating by the present tabling or flotation methods at the rate of 150 tons hourly, 7200 hours yearly, averaging 75% B. P. L. grade concentrates with an 85% recovery and a selling price of $3.00 per ton of 75% B. P. L. grade concentrates, 54.4 tons of concentrates would be produced hourly, or 391,680 tons yearly, valued at $1,175,040.00. By operating the flotation or tabling plant for a 90 or 95% recovery and then re-separating the flotation concentrates by my new method of controlling the B. P. L. content, maintaining an average of 90% recovery of B. P. L. and a grade of 77% B. P. L. shipping concentrates, 56.1 tons of concentrates are produced hourly or 403,920 tons yearly, at $3.30 per ton or $1,332,936.00 value yearly, including a premium of 30c per ton of concentrates for the higher grade.

It will be seen that the use of my improved process will increase the recovery of phosphate bearing minerals, produce higher grade concentrates, increase the life and value of the deposits and reduce operating costs with a more simplified and closer controlled operation, which particularly is true when there is a wide variation in the character of the phosphate rock or matrix.

I have shown hereinbefore that the grade of flotation concentrates can be increased with only .36% loss of B. P. L. and that the recovery of B. P. L. from flotation tailings can be increased. It may be uneconomical to dry and re-treat the flotation tailings in commercial operations. I have, however, demonstrated that a higher recovery of B. P. L. from the flotation tailings is possible, therefore a higher recovery of B. P. L. is possible by flotation and tabling methods now used, at some reduction in grade of concentrates.

Since certain further changes may be made in the steps employed in practicing my invention without departing from the scope thereof, it is intended that all matter contained in the foregoing description or shown in the accompanying drawings shall be interpreted as illustrative, and not in a limiting sense.

I claim as my invention:

1. In the method of concentrating phosphate, the steps which comprise: treating phosphate bearing material with a reagent capable of substantially changing the electrostatic susceptibility of the phosphate with respect to the electrostatic susceptibility of the remainder, drying the treated phosphate bearing material, passing the treated and dried phosphate bearing material between at least one pair of continuously rotating electrodes maintained at a high difference of direct voltage and in close proximity to the positive electrode, with a rough phosphate concentrate being repelled a substantial distance therefrom, passing the rough phosphate concentrate between at least one pair of continuously rotating electrodes maintained at a high difference of direct voltage and in close proximity to the negative electrode with a middling product being repelled a substantial distance therefrom and a final phosphate concentrate remaining in close proximity thereto, and individually collecting the middling product and the final phosphate concentrate.

2. In the method of concentrating phosphate, the steps which comprise: treating phosphate bearing material with a reagent capable of substantially changing the electrostatic susceptibility of the phosphate with respect to the electrostatic susceptibility of the remainder, drying the treated phosphate bearing material, passing the treated and dried phosphate bearing material between at least one pair of continuously rotating electrodes maintained at a high difference of direct voltage and in close proximity to the positive electrode with a rough phosphate concentrate being repelled a substantial distance therefrom and a rough tailing remaining in close proximity thereto, passing the rough phosphate concentrate between at least one pair of continuously rotating electrodes maintained at a high difference of direct voltage and in close proximity to the negative electrode with a middling product being repelled a substantial distance therefrom and a final phosphate concentrate remaining in close proximity thereto, passing the rough tailing between at least one pair of continuously rotating electrodes maintained at a high difference of direct voltage and in close proximity to the positive electrode with a middling product being repelled a substantial distance therefrom, individually collecting said final phosphate concentrate and said middling products, and returning said middling products to said phosphate bearing material for treatment therewith.

3. In the method of concentrating phosphate, the steps which comprise: treating phosphate bearing material with a reagent capable of substantially changing the electrostatic susceptibility of the phosphate with respect to the electrostatic susceptibility of the remainder, drying the treated phosphate bearing material, passing the treated and dried phosphate bearing material between at least one pair of continuously rotating electrodes maintained at a high difference of direct voltage and in close proximity to the positive electrode with a rough phosphate concentrate being repelled a substantial distance therefrom and a rough tailing remaining in close proximity thereto, passing the rough phosphate concentrate between at least one pair of continuously rotating electrodes maintained at a high difference of direct voltage and in close proximity to the negative electrode with a middling product being repelled a substantial distance therefrom and a final phosphate concentrate remaining in close proximity thereto, treating the rough tailing with a reagent capable of substantially changing the electrostatic susceptibility of the phosphate with respect to the electrostatic susceptibility of the remainder, drying the treated rough tailings, passing the treated and dried rough tailing between at least one pair of continuously rotating electrodes maintained at a high difference of direct voltage and in close proximity to the positive electrode with a middling product being repelled a substantial distance therefrom, individually collecting said final phosphate concentrate and said middling products, and returning said middling products to said phosphate bearing material for treatment therewith.

4. In the method of concentrating phosphate, the steps which comprise: washing crude phosphate ore to separate the same into pebble phosphate and washery tailings, treating the washery tailings with one or more flotation collecting reagents for coating phosphate, subjecting the treated washery tailings to flotation to segregate a rough phosphate concentrate, drying the rough phosphate concentrate, passing the dried rough phosphate concentrate between at least one pair of continuously rotating electrodes maintained at a high difference of direct voltage and in close proximity to the negative electrode with a rough concentrate being repelled a substantial distance therefrom and phosphate tailings remaining in close proximity thereto, treating the last named rough concentrate with a reagent capable of substantially changing the electrostatic susceptibility of the phosphate with respect to the electrostatic susceptibility of the remainder, drying the treated rough concentrate, passing the treated and dried rough concentrate between at least one pair of continuously rotating electrodes maintained at a high difference of direct voltage and in close proximity to the negative electrode with the phosphate tailings remaining in close proximity thereto, and combining both said phosphate tailings.

5. In the method of concentrating phosphate, the steps which comprise: washing crude phosphate ore to separate the same into pebble phosphate and washery tailings, treating the washery tailings with one or more flotation collecting reagents for coating phosphate, subjecting the treated washery tailings to flotation to segregate a rough phosphate concentrate, drying the rough phosphate concentrate, passing the dried rough phosphate concentrate between at least one pair of continuously rotating electrodes maintained at a high difference of direct voltage and in close proximity to the negative electrode with a rough concentrate being repelled a substantial distance therefrom and phosphate tailings remaining in close proximity thereto, treating the last named rough concentrate with a reagent prepared in a colloid mill and capable of substantially changing the electrostatic susceptibility of the phosphate with respect to the electrostatic susceptibility of the remainder, drying the treated rough concentrate, passing the treated and dried rough concentrate between at least one pair of continuously rotating electrodes maintained at a high difference of direct voltage and in close proximity to the negative electrode with the phosphate tailings remaining in close proximity thereto, and combining both said phosphate tailings.

6. In the method of concentrating phosphate, the steps which comprise: washing crude phosphate ore to separate the same into pebble phosphate and washery tailings, treating the washery tailings with one or more flotation collecting reagents for coating phosphate, subjecting the treated washery tailings to flotation to segregate a phosphate concentrate and phosphate tailings, drying the phosphate tailings, subjecting the dried phosphate tailings to the selective action of an electrostatic field to separate the same into a phosphate concentrate, middlings and tailings, and returning said middlings to said washery tailings for retreatment therewith.

7. In the method of concentrating phosphate, the steps which comprise: washing crude phosphate ore to separate the same into pebble phosphate and washery tailings, treating the washery tailings with one or more flotation collecting reagents for coating phosphate, subjecting the treated washery tailings to flotation to segregate a phosphate concentrate and phosphate tailings, and passing the phosphate tailings between at least one pair of continuously rotating electrodes maintained at a high difference of direct voltage and in close proximity to the positive electrode with a rough phosphate concentrate being repelled a substantial distance therefrom, passing the rough phosphate concentrate between at least one pair of continuously rotating electrodes maintained at a high difference of direct voltage and in close proximity to the negative electrode with a middling product being repelled a substantial distance therefrom and a final phosphate concentrate remaining in close proximity thereto, and individually collecting the middling product and the final phosphate concentrate.

8. In the method of concentrating phosphate, the steps which comprise: washing crude phosphate ore to separate the same into pebble phosphate and washery tailings, treating the washery tailings with one or more flotation collecting reagents for coating phosphate, subjecting the treated washery tailings to flotation to segregate a phosphate concentrate and phosphate tailings, and passing the phosphate tailings between at least one pair of continuously rotating electrodes maintained at a high difference of direct voltage and in close proximity to the positive electrode with a rough phosphate concentrate being repelled a substantial distance therefrom, treating said rough phosphate concentrate with a reagent capable of substantially changing the electrostatic susceptibility of the phosphate with respect to the electrostatic susceptibility of the remainder, passing the treated rough phosphate concentrate between at least one pair of continuously rotating electrodes maintained at a high difference of direct voltage and in close proximity to the negative electrode with a middling product being repelled a substantial distance therefrom and a final phosphate concentrate remaining in close proximity thereto, and individually collecting the middling product and the final phosphate concentrate.

9. In the method of concentrating phosphate, the steps which comprise: washing crude phosphate ore to separate the same into pebble phosphate and washery tailings, treating the washery tailings with one or more flotation collecting reagents for coating phosphate, subjecting the treated washery tailings to flotation to segregate a phosphate concentrate and phosphate tailings, and passing the phosphate tailings between at least one pair of continuously rotating electrodes maintained at a high difference of direct voltage and in close proximity to the positive electrode with a rough phosphate concentrate being repelled a substantial distance therefrom, treating said rough phosphate concentrate with a reagent capable of substantially changing the electrostatic susceptibility of the phosphate with respect to the electrostatic susceptibility of the remainder, passing the treated rough phosphate concentrate between at least one pair of continuously rotating electrodes maintained at a high difference of direct voltage and in close proximity to the negative electrode with a middling product being repelled a substantial distance therefrom and a final phosphate concentrate remaining in close proximity thereto, individually collecting the middling product and the final phosphate concentrate, and returning said middling product to said washery tailings for treatment therewith.

10. In the method of concentrating phosphate, the steps which comprise: washing crude phosphate ore to separate the same into pebble phosphate and washery tailings, treating the washery tailings with one or more flotation collecting reagents for coating phosphate, subjecting the treated washery tailings to flotation to segregate a phosphate concentrate and phosphate tailings, and passing the phosphate tailings between at least one pair of continuously rotating electrodes maintained at a high difference of direct voltage and in close proximity to the positive electrode with a rough phosphate concentrate being repelled a substantial distance therefrom, treating said rough phosphate concentrate with a reagent prepared in a colloid mill and capable of substantially changing the electrostatic susceptibility of the phosphate with respect to the electrostatic susceptibility of the remainder, passing the treated rough phosphate concentrate between at least one pair of continuously rotating electrodes maintained at a high difference of direct voltage and in close proximity to the negative electrode with a middling product being repelled a substantial distance therefrom, and a final phosphate concentrate remaining in close proximity thereto, and individually collecting the middling product and the final phosphate concentrate.

11. In the method of concentrating phosphate, the steps which comprise: washing the crude ore to separate the same into pebble phosphate and washery tailings, mixing the washery tailings with a reagent selected from the group consisting of fuel oil, distilled wood oil, sulphite liquor and fatty acid for substantially changing the electrostatic susceptibility of the phosphate with respect to the electrostatic susceptibility of the remainder, drying the mixed washery tailings, subjecting the treated and dried tailings to the selective action of an electrostatic field to separate the same into a plurality of discrete portions one of which contains a higher percentage of phosphate than the tailings, and individually collecting the separated portions.

12. In the method of concentrating phosphate, the steps which comprise: mixing phosphate bearing material with a reagent selected from the group consisting of fuel oil, distilled wood oil, sulphite liquor and fatty acid for substantially changing the electrostatic susceptibility of the phosphate with respect to the electrostatic susceptibility of the remainder, drying the mixed phosphate bearing material, subjecting the treated and dried material to the selective action of an electrostatic field to separate the same into a plurality of discrete portions one of which contains a higher percentage of phosphate than the other, and individually collecting the separated portions.

13. In the method of concentrating phosphate, the steps which comprise: treating phosphate bearing material with a reagent selected from the group consisting of fuel oil, distilled wood oil, sulphite liquor and fatty acid for substantially changing the electrostatic susceptibility of the phosphate with respect to the electrostatic susceptibility of the remainder, drying the treated phosphate bearing material, subjecting the treated and dried material to the selective action of an electrostatic field to separate the same into phosphate tailings and a rough phosphate concentrate, treating the rough phosphate concentrate with a reagent selected from the group consisting of fuel oil, distilled wood oil, sulphite liquor and fatty acid for substantially changing the electrostatic susceptibility of the phosphate with respect to the electrostatic susceptibility of the remainder, drying the treated rough phosphate concentrate, and subjecting the treated and dried rough phosphate concentrate to the selective action of an electrostatic field to separate out a phosphate tailing.

14. In the method of concentrating phosphate, the steps which comprise: washing crude phosphate ore to separate the same into pebble phosphate and washery tailings, treating the washery tailings with a reagent selected from the group consisting of fuel oil, distilled wood oil, sulphite liquor and fatty acid for substantially changing the electrostatic susceptibility of the phosphate with respect to the electrostatic susceptibility of the remainder, drying the treated washery tailings, subjecting the treated and dried washery tailings to the selective action of an electrostatic field to separate the same into phosphate tailings and a rough phosphate concentrate, treating the rough phosphate concentrate with a reagent selected from the group consisting of fuel oil, distilled wood oil, sulphite liquor and fatty acid for substantially changing the electrostatic susceptibility of the phosphate with respect to the electrostatic susceptibility of the remainder, drying the treated rough phosphate concentrate, and subjecting the treated and dried rough phosphate concentrate to the selective action of an electrostatic field to separate out a phosphate tailing.

15. In the method of concentrating phosphate, the steps which comprise: mixing phosphate bearing material with a relatively viscous petroleum distillate having a low order of volatility for substantially changing the electrostatic susceptibility of the phosphate with respect to the electrostatic susceptibility of the remainder, drying the mixed phosphate bearing material, subjecting the mixed and dried material to the selective action of an electrostatic field to separate the same into a plurality of discrete portions one of which contains a higher percentage of phosphate than the other, and individually collecting the separated portions.

16. In the method of concentrating phosphate, the steps which comprise: treating phosphate bearing material with one or more wet process collecting reagents for coating phosphate, subjecting the treated phosphate bearing material to wet process separation to segregate a rough phosphate concentrate, drying the rough phosphate concentrate, subjecting the dried rough phosphate concentrate to the selective action of an electrostatic field to separate the same into a final phosphate concentrate and tailings, and individually collecting said final concentrate and tailings.

17. In the method of concentrating phosphate, the steps which comprise: treating phosphate bearing material with one or more wet process collecting reagents for coating phosphate, subjecting the treated phosphate bearing material to wet process separation to segregate a rough phosphate concentrate, drying the rough phosphate concentrate, passing the dried rough phosphate concentrate between at least one pair of electrodes maintained at a high difference of direct voltage and in close proximity to the negative electrode with a rough concentrate being repelled a substantial distance therefrom and phosphate tailings remaining in close proximity thereto, and individually collecting the rough concentrate and phosphate tailings.

18. In the method of concentrating phosphate, the steps which comprise: treating phosphate bearing material with one or more wet process collecting reagents for coating phosphate, subjecting the treated phosphate bearing material to wet process separation to segregate a rough phosphate concentrate, drying the rough phosphate concentrate, passing the dried rough phosphate concentrate between at least one pair of electrodes maintained at a high difference of direct voltage and in close proximity to the negative electrode with a rough concentrate being repelled a substantial distance therefrom and phosphate tailings remaining in close proximity thereto, and passing the last named rough concentrate between at least one pair of electrodes maintained at a high difference of direct voltage and in close proximity to the negative electrode with phosphate tailings remaining in close proximity thereto.

19. In the method of concentrating phosphate, the steps which comprise: treating phosphate bearing material with one or more flotational collecting reagents for coating phosphate, subjecting the treated phosphate bearing material to flotation to segregate a rough phosphate concentrate, drying the rough phosphate concentrate, passing the dried rough phosphate concentrate between at least one pair of electrodes maintained at a high difference of direct voltage and in close proximity to the negative electrode with a rough concentrate being repelled a substantial distance therefrom and phosphate tailings remaining in close proximity thereto, treating the last named rough concentrate with a reagent capable of substantially changing the electrostatic susceptibility of the phosphate with respect to the electrostatic susceptibility of the remainder, drying the treated rough concentrate, and passing the treated and dried rough concentrate between at least one pair of electrodes maintained at a high difference of direct voltage and in close proximity to the negative electrode with phosphate tailings remaining in close proximity thereto.

20. In the method of concentrating phosphate, the steps which comprise: treating phosphate bearing material with one or more flotation collecting reagents for coating phosphate, subjecting the treated phosphate bearing material to flotation to segregate a phosphate concentrate and a product the phosphate content of which is lower than that of said phosphate concentrate, drying said product, subjecting the dried product to the selective action of an electrostatic field to separate the same into a phosphate concentrate and tailings, and individually collecting the last named phosphate concentrate and tailings.

21. In the method of concentrating phosphate, the steps which comprise: treating phosphate bearing material with one or more flotation collecting reagents for coating phosphate, subjecting the treated phosphate bearing material to flotation to segregate a phosphate concentrate and a product the phosphate content of which is lower than that of said phosphate concentrate, drying said product, and passing the dried product between at least one pair of electrodes maintained at a high difference of direct voltage and in close proximity to the positive electrode with a phosphate concentrate being repelled a substantial distance therefrom and tailings remaining in close proximity thereto.

HERBERT B. JOHNSON.